Jan. 14, 1958 M. L. FROOT 2,819,490
APPARATUS FOR MAKING ONE PIECE HOLLOW ARTICLES
OF THERMO PLASTIC MATERIAL
Filed March 19, 1952 7 Sheets-Sheet 1

INVENTOR.
MARK L. FROOT
BY
*J. B. Felshin*
ATTORNEY

Jan. 14, 1958

M. L. FROOT 2,819,490

APPARATUS FOR MAKING ONE PIECE HOLLOW ARTICLES
OF THERMO PLASTIC MATERIAL

Filed March 19, 1952

INVENTOR.
MARK L. FROOT

BY

ATTORNEY

Jan. 14, 1958 M. L. FROOT 2,819,490
APPARATUS FOR MAKING ONE PIECE HOLLOW ARTICLES
OF THERMO PLASTIC MATERIAL
Filed March 19, 1952 7 Sheets-Sheet 3

INVENTOR.
MARK L. FROOT
BY
J. B. Felshin
ATTORNEY

Jan. 14, 1958

M. L. FROOT 2,819,490

APPARATUS FOR MAKING ONE PIECE HOLLOW ARTICLES
OF THERMO PLASTIC MATERIAL

Filed March 19, 1952

INVENTOR.
MARK L. FROOT

BY

ATTORNEY

Jan. 14, 1958     M. L. FROOT     2,819,490
APPARATUS FOR MAKING ONE PIECE HOLLOW ARTICLES
OF THERMO PLASTIC MATERIAL
Filed March 19, 1952     7 Sheets-Sheet 5

INVENTOR.
MARK L. FROOT
BY
*J. B. Felshin*
ATTORNEY

INVENTOR.
MARK L. FROOT
BY
ATTORNEY

Jan. 14, 1958     M. L. FROOT     2,819,490
APPARATUS FOR MAKING ONE PIECE HOLLOW ARTICLES
OF THERMO PLASTIC MATERIAL

Filed March 19, 1952                            7 Sheets-Sheet 7

INVENTOR.
MARK L. FROOT
BY
ATTORNEY

United States Patent Office 2,819,490
Patented Jan. 14, 1958

2,819,490

APPARATUS FOR MAKING ONE PIECE HOLLOW ARTICLES OF THERMO PLASTIC MATERIAL

Mark L. Froot, New York, N. Y., assignor to Doralaine Corporation, Newark, N. J., a corporation of New Jersey Application March 19, 1952, Serial No. 277,469

36 Claims. (Cl. 18—20)

This invention relates to apparatus for making one piece hollow articles of thermo plastic material. It is particularly directed to apparatus for continuously extruding thermo plastic material, making tubes of such material, inserting the tubes into molds and blowing the tubes against the interior surfaces of the mold to form hollow articles such as bottles or the like containers or devices.

An object of this invention is to provide apparatus of the character described which will operate with relatively high speed for carrying out the simultaneous and continuous process of making containers, which will be fully automatic, and which will only require feeding plastic material to a hopper of an extruder in order to start the automatic operation of the process to completion of the hollow articles or containers.

A further object of this invention is to provide apparatus of the character described, comprising an extruder for extruding a tube of plastic material on a mandril in horizontal position, means to cut the tube on the mandril so as to close one end thereof, means to move the mandril from a horizontal position to a vertical position between two parts of a split mold, means to move the two mold parts together to enclose the tube, means to blow air into the tube to expand the tube against the inner surface of the mold to form a bottle or container, and means to open the mold so that the bottle or container may be removed.

Another object of this invention is to provide apparatus of the character described including means to water cool the molds during the molding operation.

Yet another object of this invention is to provide apparatus of the character described comprising a rotary machine, means to intermittently rotate said machine, said machine comprising a plurality of angularly arranged, similar molding mechanisms, each provided with its mandril and control mechanism therefor, and a single extruder for extruding tubular, plastic material on one mandril, the arrangement being such that the entire process of making the containers is simultaneous and continuous, each container being started at one station as each mechanism and its mandril stop at said station, and the remainder of the process is carried out during the continued intermittent rotation of said mechanism, a container made by said mechanism being fully completed before said mechanism reaches the initial station. Thus, as one section of the apparatus receives the extrusion, the other sections go through the molding operation.

Another object of this invention is to provide apparatus of the character described including highly improved means to synchronize the movement of the mandril with the movements of the mold.

Yet another of the present invention is to provide in apparatus of the character described, a two part mold, means to supply air to a mandril for blowing or expanding a tube within the mold, and air valve means to control the passage of the air to the mandril and adapted to open automatically upon bringing the two parts of the mold together.

Yet a further object of this invention is to provide a machine of the character described including highly improved means for synchronizing the opening of the molds and the closing of the molds automatically with the movement of the mandril and the blowing of air through the mandril.

Still a further object of this invention is to provide in apparatus of the character described, an intermittently rotary machine comprising a plurality of similar units, each unit comprising a pair of mold parts, means for moving said mold parts towards each other for closing the mold, means for moving the mold parts away from each other to open the mold, an air cylinder to control the movement of the mold parts, a valve to control the passage of air to the cylinder, and a fixed cam to control the operation of the control valve as the machine rotates.

Yet another object of this invention is to provide in a machine of the character described, a mandril associated with each unit, movable from a horizontal position where it receives an extruded plastic tube thereon from an extruder, down to a vertical position, the movement of the mandril from a horizontal to a vertical position being controlled by a fixed annular cam operative to control the movement of the mandril as th machine rotates.

Still another object of this invention is to provide in a machine of the character described, highly improved means for extruding a tube on the mandril to a position where two parts of the mold come together and enclose the tube, and then blowing air throgh the mandril to expand the tube against the inside of the mold to form a container.

Yet a further object of this invention is to provide a simple and compact apparatus of the character described which will be relatively inexpensive to manufacture, with which containers may be made quickly and economically, which will be sure and positive in operation and practical and efficient to a high degree in use.

Other objects of this invention will in part be obvious and in part hereinafter pointed out.

The invention accordingly consists in the features of construction, combinations of elements, and arrangement of parts, which wil be exemplified in the construction hereinafter described, and of which the scope of invention will be indicated in the following claims.

In the accompanying drawings in which are shown various illustrative embodiments of this invention, Fig. 1 is a top plan view illustrating part of the apparatus embodying the invention;

Figure 8:
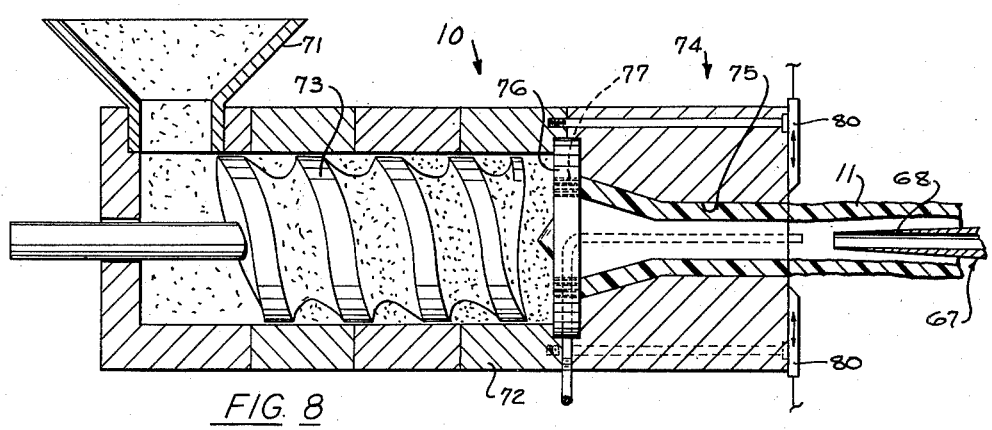
Fig. 8 is a vertical cross sectional view through part of an extruding apparatus.

Referring now in detail to the drawing, and particularly to Fig. 8, numeral 10 designates an extrusion apparatus for extruding a tube 11 of plastic material.

In the drawing, numeral 12 designates apparatus embodying the invention for making bottles or containers from the extruded material 11. The apparatus 12 (Fig. 4) comprises a horizontal table or platform 13 on which is mounted a fixed frame 14. The frame 14 comprises a horizontal wall 15 from which extends an upwardly vertical wall 16.

Figure 3:
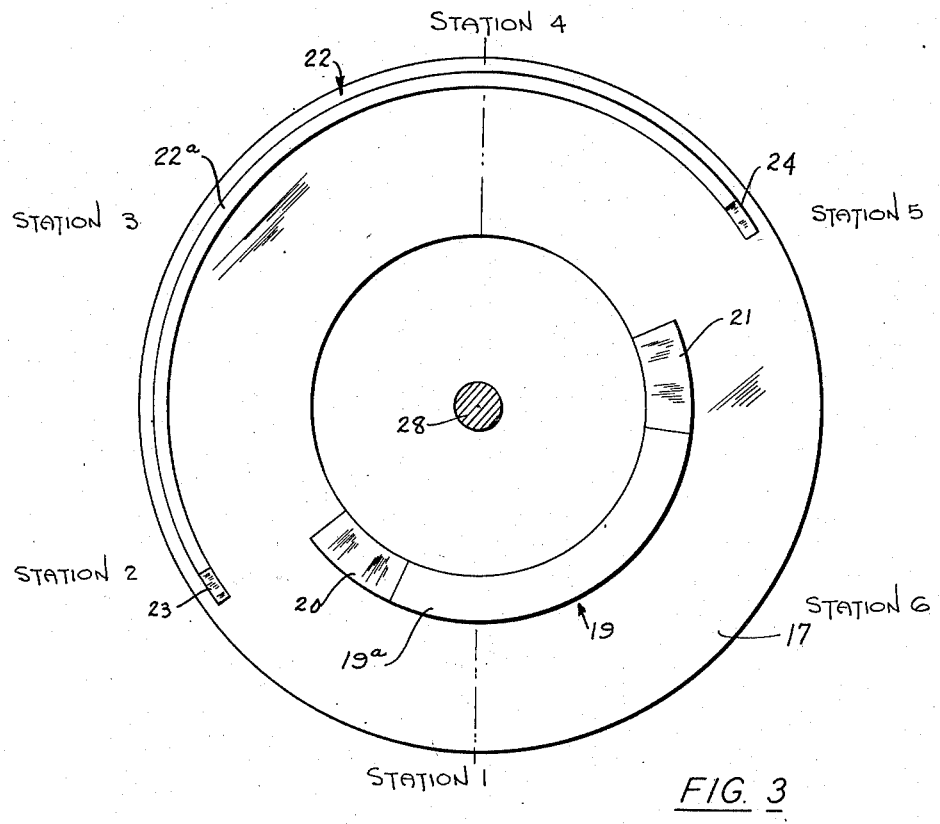
Fig. 3 is a cross sectional view taken on the line 3—3 of Fig. 4.
Figure 4:
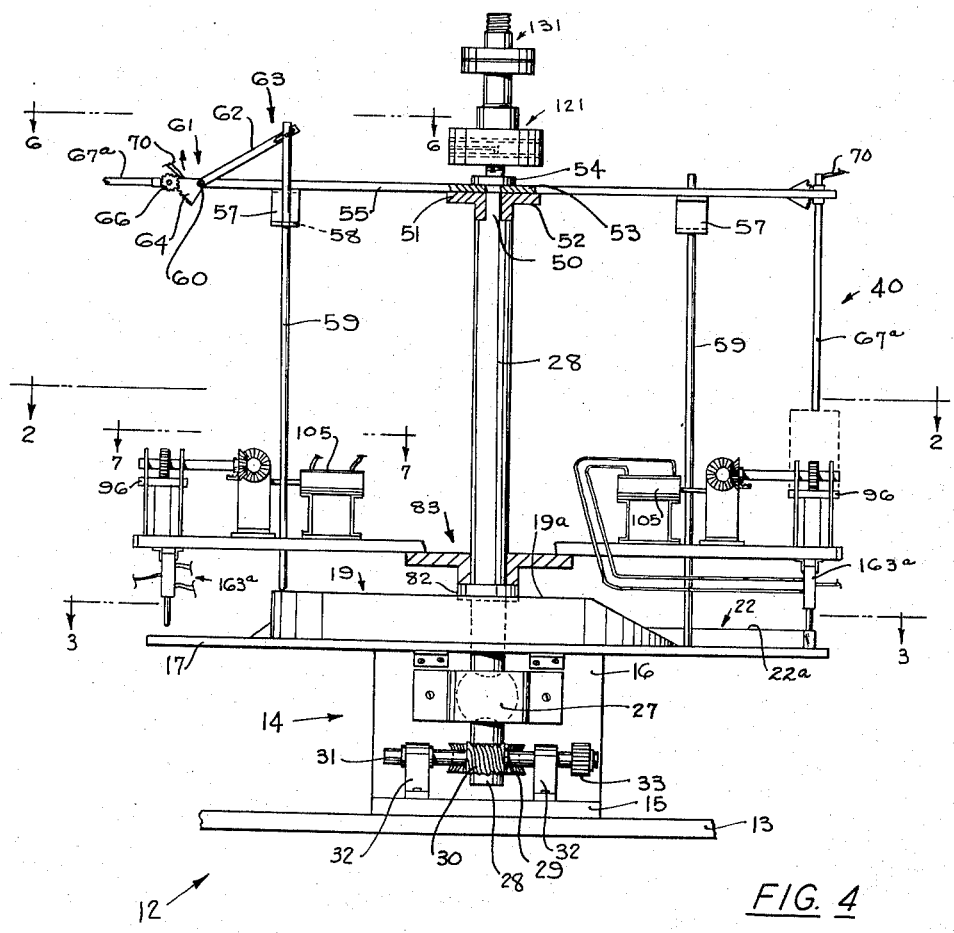
Fig. 4 is a cross sectional view taken on the line 4—4 of Fig. 1, and with other parts in cross section.
Figure 15:
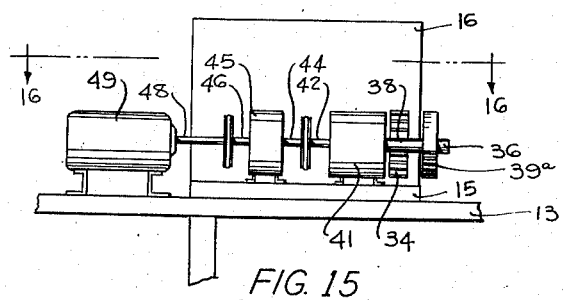
Fig. 15 is a vertical view illustrating a drive mechanism for a rotor.

Mounted on the vertical wall 16 is a stationary horizontal plate 17 shown in Figs. 3 and 4 of the drawing. Mounted on the top of the plate 17 is a part circular cam 19 having a high part 19a and downwardly sloping ramps 20 and 21 at the ends thereof. Also mounted on the plate 17 is a second part circular cam 22 having a high part 22a and downwardly sloping ramps 23 and 24 at the ends thereof. The cams 19 and 22 are concentric with one another about the center of the plate 17. The cam 19 is for the control of a mandril to be described hereinafter, and will be called a mandril cam. The cam 22 is for the control of a mold as will appear hereinafter and will be called the mold cam.

If a vertical line is drawn in Fig. 3 through the axis of the cams 19 and 22, the lower end of said line will be designated as "station 1." A point 60° from "station 1" in a clockwise direction, on Fig. 3, will be designated as "station 2." Moving along another 60°, is a point designated as "station 3." At the upper end of the vertical line through said axis is located "station 4." Sixty degrees around in a clockwise direction from "station 4" is "station 5." Moving around 60° from "station 5" is "station 6." Sixty degrees from "station 6" is said "station 1."

It will be noted that the ramp 20 of the cam 19 starts rising in a counter clockwise direction (Fig. 3) after "station 2" and reaches full height before "station 1." The ramp 21 begins going down in a counter clockwise direction just past "station 6" toward "station 5," as shown in Fig. 3 of the drawing. The ramp 23 on the cam 22 starts rising in a clockwise direction just prior to "station 2," and the ramp 24 comes down in a clockwise direction just prior to "station 5," as shown in Fig. 3 of the drawing. The cam 19 is of uniform height as at 19a between the ramps 20 and 21. The cam 22 is of uniform height as at 22a between the ramps 23 and 24.

Figure 16:
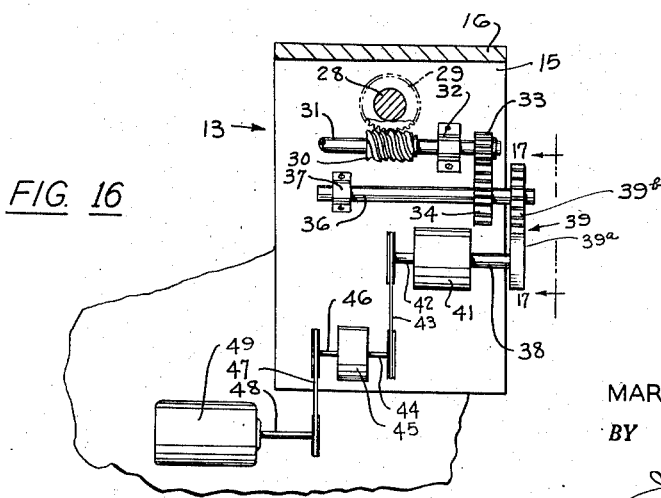
Fig. 16 is a cross sectional view taken in line 16—16 of Fig. 15 and illustrating drive means for a rotor.

Mounted on one of the frame walls 16 is a bearing 27 (Fig. 4) on which is mounted a vertical, axial shaft 28. The shaft 28 is axial relative to the cams 19 and 22 and rises thereabove. On the lower end of the shaft 28 is a wormwheel 29 (Figs. 4, 16), meshing with a worm 30 on a horizontal shaft 31 mounted on suitable bearings or pillow blocks 32 supported on the wall 15. On the shaft 31 is a pinion 33 meshing with a pinion 34 fixed on another horizontal shaft 36 parallel to shaft 31 and supported on suitable bearings 37 mounted on the plate 15. Also supported on the plate 15 is a horizontal shaft 38. Interconnecting the shafts 36 and 38 is an intermittent Geneva gear drive 39 so arranged that while the shaft 38 rotates continuously, the shaft 36 will rotate intermittently, the gearing beng so selected that the vertical shaft 28 will stop after each 60 degrees of rotation.

Figures 7, 17:
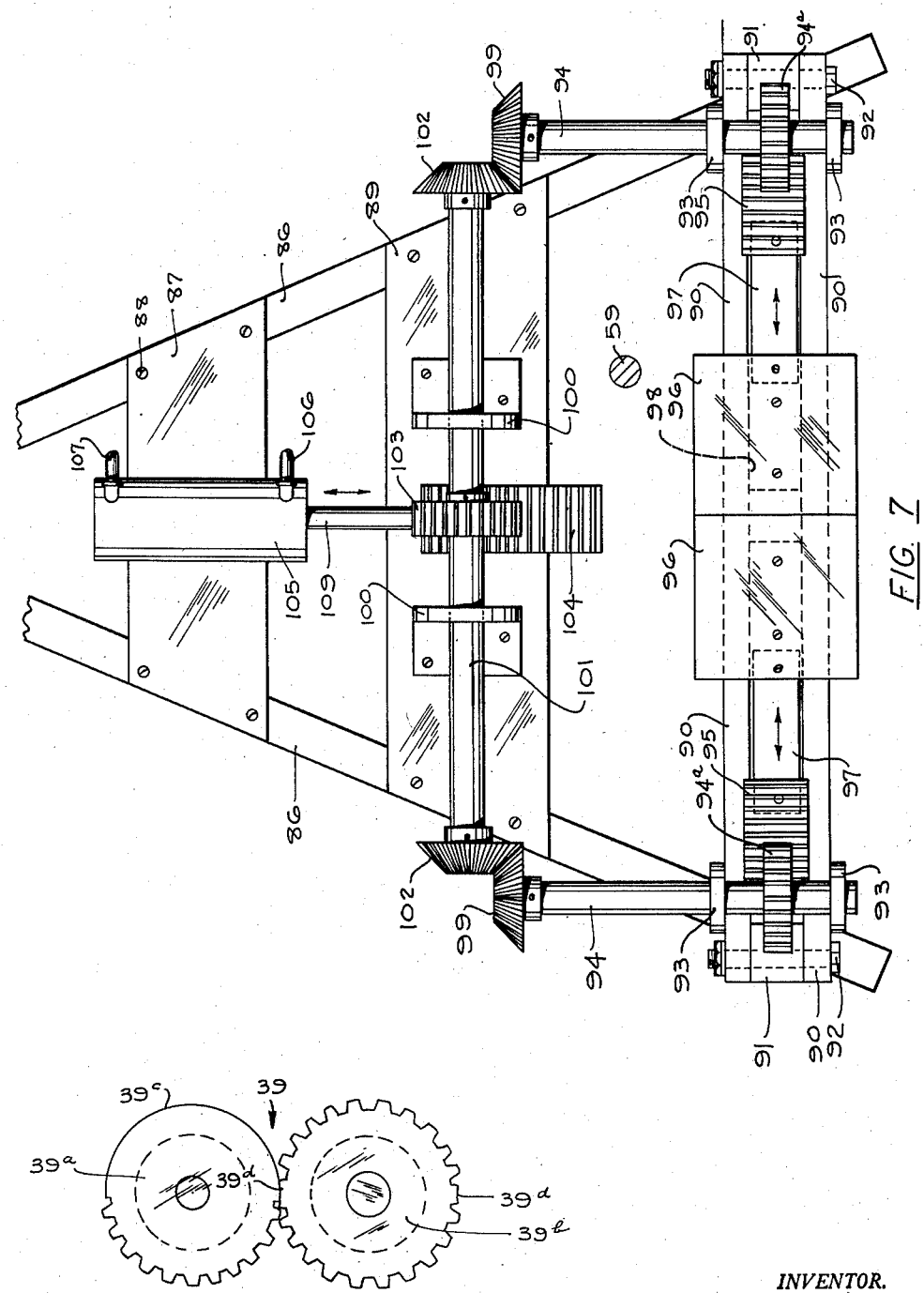
Fig. 7 is an enlarged plan view of the mold units and actuating mechanism therefor.
Fig. 17 is a view of the intermittent drive gears.

The intermittent gearing 39 comprises a drive gear 39a (Fig. 17) on drive shaft 38 and a drive gear 39b on shaft 36. Gear 39a has 180° of gear teeth and 180° smooth periphery 39c, while gear 39b has two diametrically opposed concave portions 39d to permit the drive gear 39a to rotate 180° without driving the gear 39b each time one of the concave portions is reached. This type of intermittent drive is well known.

Figure 1:
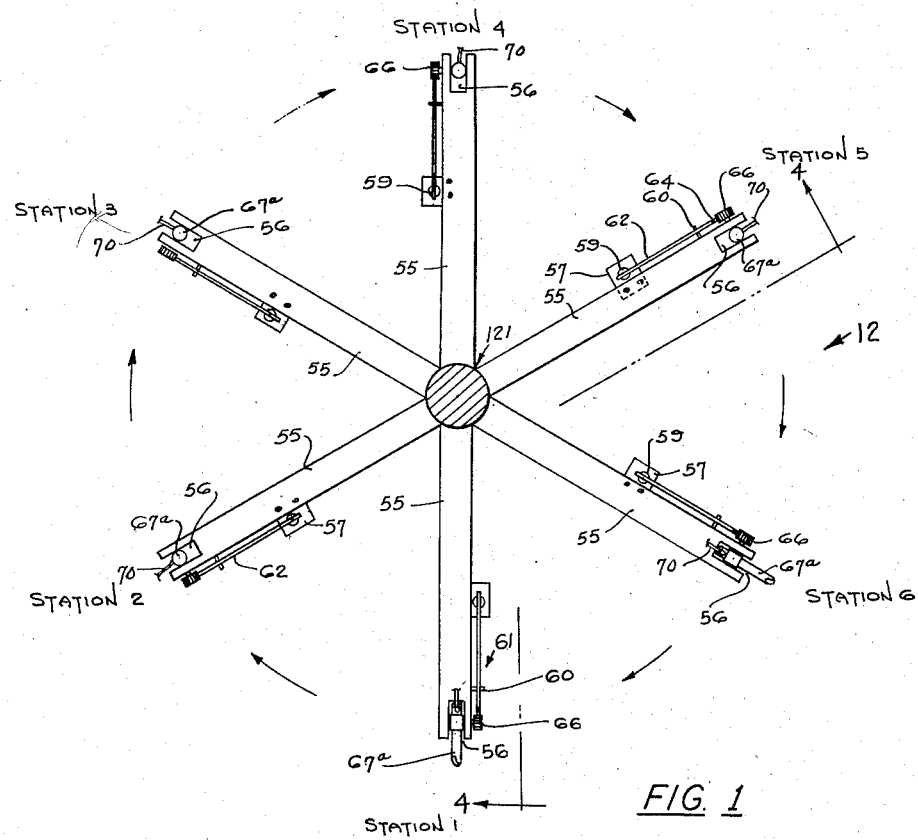
Figure 2:
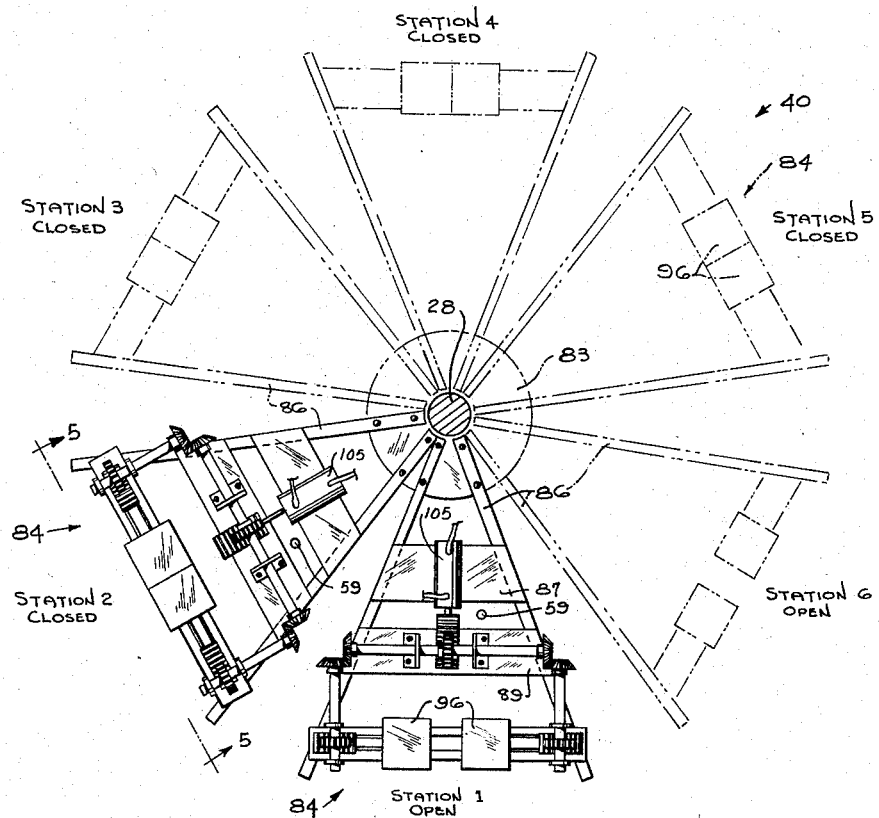
Fig. 2 is a cross sectional view taken on the line 2—2 of Fig. 4.

It will be understood that while the drawing shows the rotor as stopping at each of six stations, such number can be varied and is shown only by way of illustration. The shaft 28 imparts rotatinon to a rotor 40 (Figs. 1, 2, 4) which will be described in greater detail hereinafter. The shaft 38 is connected through a reduction box 41 (Fig. 16) to a shaft 42 which is belted as by a belt 43 to a shaft 44 connected through a variable speed drive 45 of any usual type, such as a Reeves drive, to a shaft 46 belted as by a belt 47 to a pulley on an armature 48 of an electric motor 49.

It will now be understood that when the motor 49 is energized, the vertical shaft 28, and hence the rotor 40, will be intermittently rotated through angles of 60 degrees for a purpose hereinafter appearing.

Figure 18:
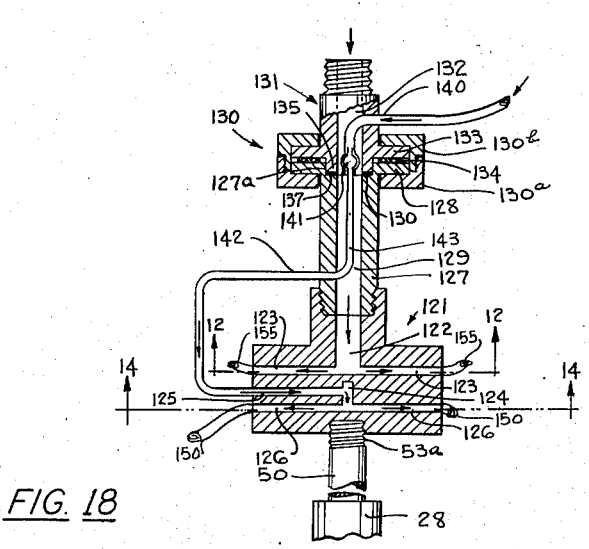
Fig. 18 is an enlarged view of the air and water distributing valves on the center post.

At the upper end of the shaft 28 is a reduced, upwardly extending stem 50 passing through a flanged collar 51 having an annular, horizontal flange 52. Mounted on the flange 52 is a spider-like member 53 having a central opening through which the stem 50 passes. The upper end of the stem 50 is screwthreaded as at 53a (Fig. 18) and screwed thereon is a nut 54 for fixing the spider 53 against the collar 51.

The spider 53 comprises six radial, horizontal arms 55 (Fig. 1) spaced 60 degrees apart. Said arms 55 are of equal length, and each is formed with a slot 56 at its outer end. Fixed to each arm 55 is a bracket 57 formed with a vertical through opening 58 through which extends a vertical pin 59, the lower end of which is adapted to ride on the cam 19 or plate 17 as the rotor 40, of which the spider 53 is a part, rotates.

Pivoted to a horizontal pin 60, extending from each arm 55, is a lever 61 having an arm 62, at one end having a pin and slot connection 63 with the vertical pin 59. At the other end of the lever 61 is a segmental gear 64.

Figure 9:
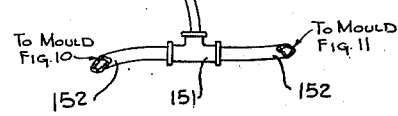
Fig. 9 is a partial vertical view showing a mandril in one position with an extruded and cut tube thereon.
Figure 9:
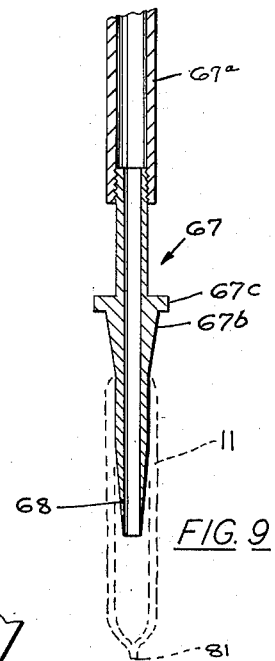
Figure 6:
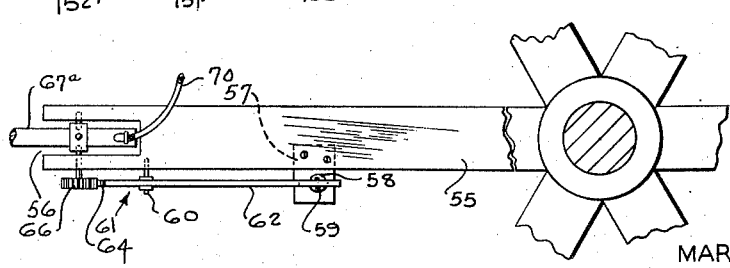
Fig. 6 is an enlarged view taken along plane 6—6 of Fig. 4.

Rotatably mounted on the outer end of each arm 55, is a pinion 66 meshing with a segmental gear 64. Fixed for rotation with the pinion 66 and having a rear end extending into the slot 56 is a hollow mandril 67, the front end of which is open and tapered, as shown at 68 in Figs. 8 and 9. Screwed onto the rear end of each mandril 67 is a pipe 67a to which is connected an air tube 70 for a purpose hereinafter appearing. Mandril 67 has a tapered portion 67b on which the extruded tube 11 frictionally engages. Said mandril also has a collar flange 67c at the end of the tapered portion 67b.

The extrusion apparatus 10 may be of any usual construction and includes a hopper 71 (Fig. 8) into which is inserted plastic material from which the final bottles or containers are to be made. The plastic material passes from the hopper 71 to a vessel 72 in which is rotated a feeding worm 73 to force the plastic material forwardly. Attached to the front end of the vessel 72 is a head 74 having a tubular passage 75. Between the vessel 72 and the head 74 is a plate 76 formed with a usual opening 77 through which the plastic material passes to the passage 75. The tube 11 is formed as it passes through the passage 75 and onto the mandril 67 when the latter is in a horizontal position. On the head 74 are usual cutters 80 for cutting a length of the extruded tube 11 and for sealing the cut end of a tube 81.

The extrusion of the plastic material onto a mandril is in horizontal position at "station 1" and while the rotor is stationary. As the rotor rotates, the mandril with a tube thereon moves from "station 1" to "station 2" and comes down from horizontal to vertical position due to the action of the cam 19 on the pin 59 and the lever 61 associated with said mandril. Pin 59 associated with said mandril slides down ramp 20 between "stations 1 and 2" to lower the mandril. The same mandril is again swung up from vertical to horizontal position after it passes "station 5" due to its pin 59 riding up on ramp 21.

Fixed to the shaft 28, just above the cam 19 is a collar 82 which supports a flanged hub 83. Fixed to the hub 83 are six segmental mold units 84, there being one for each mandril. Each arm 55 substantially bisects one of the mold units 84. The mold units 84 are all similar so that only one thereof will be described.

Figure 5:
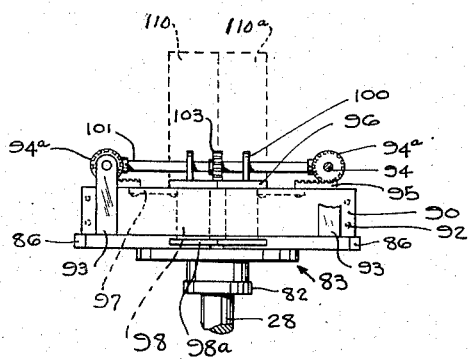
Fig. 5 is a vertical view taken along plane 5—5 of Fig. 2.

Each mold unit 84 (Figs. 2, 5, 7) comprises a pair of diverging square bars 86 in the same horizontal plane and spaced apart less than 60 degrees. Mounted on each pair of bars 86 is a horizontal plate 87 attached thereto by screws 88, or in any other suitable manner. Also interconnecting the bars 86 is a horizontal plate 89 parallel to the plate 87 but spaced outwardly therefrom.

Also mounted on the bars 86 and fixed thereto in any suitable manner are a pair of vertical parallel plates 90, the lower edges of which contact the bars 86. Between the ends of the plates 90 are spacer blocks 91. The plates 90 are fixed to the spacer blocks 91 by horizontal bolts 92 passing through registering openings in said plates and blocks. Attached to the outer sides of the plates 90 adjacent each end thereof, are a pair of aligned, vertical bars 93 projecting above the upper edges of said plates, the upper edges of said bars being apertured to form bearings for horizontal shafts 94 disposed at right angles to said plates. On each shaft 94 and between each pair of bars 93 is a fixed pinion 94a for rotation with such shaft.

Slidably mounted on each of the ends of the plates 90 is a rack 95 disposed below and meshing with one of the pinions 94a. Slidably mounted on the upper edges of the plates 90 are a pair of square plates 96, each interconnected by a connecting bar 97 to one of the racks 95. Attached to the underside of each plate 96 is a slide bar 98 projecting downwardly to a point below the lower edges of the plate 90. Fixed to the under side of each slide bar 98 is a guide plate 98a adapted to contact the under edges of plates 90. It will now be observed that as each shaft 94 is rotated in one direction, the plates 96 will be slidably moved from the middle of the plates 90 toward the outer ends of said plates, and as said shaft is rotated in the opposite direction, the plates 96 will be moved inwardly toward the middle of the plates 90.

At the inner end of each shaft 94 is a bevelled gear 99. Mounted on the plate 89 are a pair of bearings 100 supporting a horizontal, transverse shaft 101. At the outer ends of the shaft 101 are bevelled gears 102 meshing with the gears 99. On the center of the shaft 101 is a pinion 103. When the pinion 103 is rotated, in the manner hereinafter appearing, in one direction, plates 96 move away from each other, and when said pinion is rotated in the opposite direction, the plates 96 are brought together.

Slidably mounted on the support 89 and between the bearings 100 is a rack 104 disposed below and meshing with the pinion 103 and at right angles to the shaft 101. The rack 104 is disposed radially of the shaft 28. Mounted on the plate 87 is an air cylinder 105 located in alignment with the rack 104. The ends of the cylinder are closed. Connected to one end of the cylinder is a pipe 106 and connected to the other end of the cylinder is a pipe 107. Within the cylinder is a piston 108 to which is attached a piston rod 109 connected in any suitable manner to a rack 104. As the piston moves outwardly, the plates 96 are moved inwardly toward each other, and as the piston moves inwardly toward the axis of the rotor, the plates 96 are moved apart.

Mounted on the plates 96 of each unit 84 are a pair of hollow mold parts 110, 110a, respectively. Said mold units each have a bottom wall 111 from which extend guide flanges 112 to receive the front and rear edges of the plates 96. The mold members are attached to the plates 96 by means of set screws 113 screwed to the flanges 112 for pressing the plates 96 against the undersurfaces of the mold parts.

The mold parts 110, 110a, are formed with front and rear walls 115, outer side walls 116, inner walls 118 and top walls 119. The inner walls 118 are recessed as at 120 to form the shape of the bottle or other container to be finally formed when the plates 96 are moved toward each other to bring walls 118 into contact with each other. When the mandril 67 with a plastic tube 11 thereon, comes down to vertical position at "station 2," the mold parts are brought together on opposite sides of the mandril which then projects down into the cavity produced by the two recesses 120. Air blown through the tube 70 and mandril 67 will expand the tube 11 against the inner surfaces of said recesses to form a bottle or container as will be described hereinafter, or other hollow articles.

Means is provided to supply air for moving the pistons 108 back and forth within the cylinders 105 and for expanding the plastic tube within the mold. Means is also provided to supply water for cooling the molds. To this end, there is screwed to the upper screw threaded end 53a of stem 50 a fitting 121 formed at its upper end with an axial passage 122 communicating at its lower end with six horizontal equiangularly spaced radial passages 123. Said fitting 121 is also formed below the passages 123 with a short vertical axial passage 124, the upper end of which communicates with a radial passage 125 and also communicating at its lower end with six horizontal equiangularly spaced radial passages 126.

Screwed to the upper end of the fitting 121 is a pipe 127 extending upwardly therefrom. At the upper end of pipe 127 is an outwardly extending flange 128. Pipe 127 is formed with a through passage 129 communicating with passage 122. The upper end of pipe 127 is counterbored as at 127a. Connected to the upper end of pipe 127 by coupling 130 is a fixed pipe 131 formed with a through passage 132 communicating with passage 129. The pipe 131 is formed with a flange 133 overlying the flange 128. A bearing 134 is interposed between the flanges 133 and 128. At the lower end of pipe 131 is a portion 135 projecting into the counterbore 127a. A packing 137 is interposed between portion 135 and the bottom of the counterbore.

The coupling 130 may comprise a pair of flanged sleeves 130a and 130b engaging the flanges 128 and 133 respectively and screwed together.

The upper end of the fixed pipe 131 may be connected in any suitable manner to an airline for receiving air. It will now be understood that the shaft 28, the fitting 121 and the pipe 127 rotate while the pipe 131 is fixed.

Thus air is supplied to the passages 123 continuously as the rotor rotates. Extending through a suitable opening in fixed pipe 131 is a pipe 140 which is connected to a water line. The pipe 140 projects into the passage 132 and has a downwardly extending axial stem 141. Extending through the lower end of the pipe 127 is a pipe 142 projecting into passage 129 and formed with an upwardly extending axial stem 143. The upper end of the stem 143 has a rotary interfitted connection with the lower end of the pipe stem 141 so that water received by fixed pipe 140 may pass to the pipe 142. The pipe stems 141 and 143 are coaxial with pipes 127 and 131. It will thus be observed that while the air supply and the water supply are fixed, air and water are transmitted to all the units continuously as they rotate with the rotor.

The pipe 142 extends outside of the fitting 121 but is connected to the radial passage 125 so that water will pass through said passage and through passage 124 to the six radial passages 126. The coupling device 127, 131, 140 and 142 are well known and no claim is made specifically thereto. This device is known as the Johnson joint manufactured by The Johnson Co. of Three Rivers, Michigan.

Figure 14:
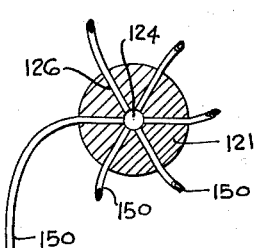
Fig. 14 is a sectional view on line 14—14 of Fig. 18 and illustrating a water cooling system to various units.
Figure 10:
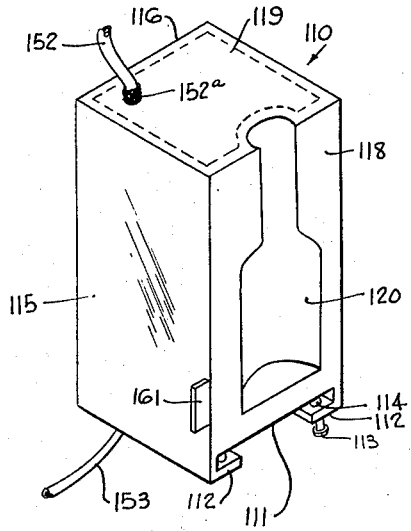
Fig. 10 is a perspective view of one of the mold parts.
Figure 11:
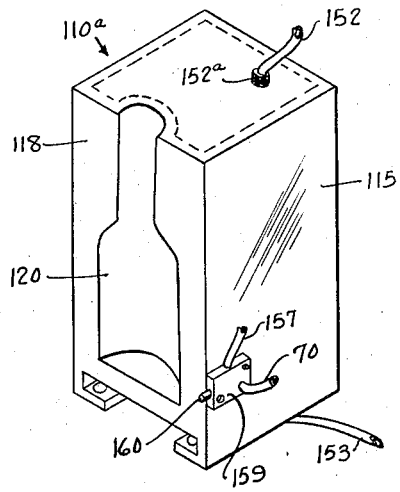
Fig. 11 is a perspective view of the other mold part.

Connected to each of the six radial passages 126 (Fig. 18) are flexible copper tubes 150 (Fig. 14). Connected to each tube 150 is a T-fitting 151 having branches connected to tubes 152. The two tubes 152 are connected to cold water inlets 152a at the upper ends of each complementary pair of mold parts 110, 110a (Figs. 10, 11). Thus, each pair of mold parts receives cold water from one of the passages 126.

Connected to the lower ends of the mold parts 110, 110a are outlets or drain pipes 153 (Figs. 10 and 11).

Figure 12:
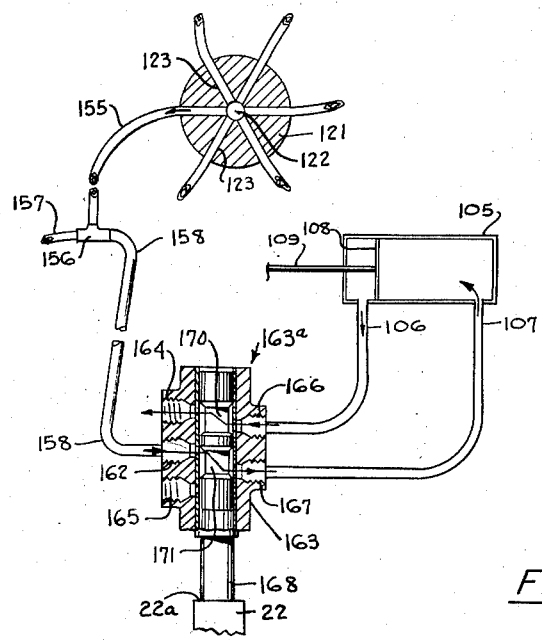
Fig. 12 is a diagrammatic view illustrating an air system for controlling the operation of an air cylinder and a piston which controls the cylinder in its up position, and a piston in the air cylinder in position for closing the mold or bringing the mold parts together.

Connected to each of the passages 123 is an air supply tube 155 (Fig. 12). Each of the pipes 155 is connected to a T-fitting 156, the branches of which are connected to pipes 157 and 158, respectively. Each pipe 157 is connected to a two-way valve 159 on one of the mold parts, 110a. Each tube 70 which is connected to a mandril 67 also is connected to the valve 159. The valve 159 is attached to a side wall 115 of mold part 110a adjacent surface 118 and extending from the valve 159 is a valve stem 160 normally projected beyond said surface when the two mold parts 110, 110a are separated. Fixed to one of the walls 115 of each mold part 110 is an abutment 161 so located that when the mold parts are brought together, the valve stem 160 contacts said abutment and is pressed inwardly thereby. The arrangement is such that when the mold members 110, 110a are apart, air valve 159 is shut so that air cannot pass from tube 157 to tube 70. However, when the mold parts come together and the valve stem 160 is pressed inwardly, valve 159 interconnects tube 157 to tube 70 so that air may pass to the mandril 67 to expand the tube 11 against the inner surfaces 120 of the two mold members to form a container or bottle.

Each tube 158 is connected to an inlet port 162 of a vertical valve housing 163 comprising part of a valve 163a. There is a valve 163a for each of the six units and each valve housing is attached to the underside of one of the bars 88 of each unit. Each valve housing 163 has exhaust ports 164 and 165 disposed above and below the inlet port 162. The valve housing 163 also has on the side opposite to the ports 162, 164, 165, a port 166 connected to conduit 106 which leads to one side of the cylinder 105, and a port 167 to which is connected the conduit 107 which leads to the opposite end of such cylinder. Vertically slidable in each valve housing 163 is a valve stem 168 resting on the top surface 22a of the cam 22 on the plate 17. Each valve stem 168 has two passages 170 and 171. When the valve stem 168 has been raised by cam 22 as the rotor turns, passage 171 interconnects port 162 with port 167 as shown in Fig. 12 so that air under pressure passes to one end of cylinder 105 to project the piston stem 109 for bringing the mold parts 110, 110a of the associated unit, together. At the same time, passage 170 interconnects port 166 with exhaust port 164 so that air can be exhausted from the cylinder as the piston moves to the left looking at Fig. 12.

Figure 13:
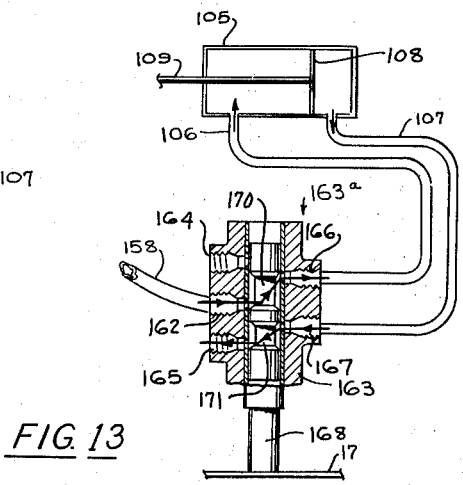
Fig. 13 is a view similar to Fig. 12 but showing the control valve down, and the piston and cylinder in position for separating the mold parts.

It will now be observed that cam 22 starts rising just prior to station 2 at the point where cam 19 begins to drop at 20 (Fig. 3). Thus, as soon as a mandril for a unit passing from station 1 to station 2 has come down to vertical position, the mold parts 110, 110a for the associated unit come together, and at the same time valve 159 is actuated to supply air to tube 70 and hence to the mandril to expand the plastic tube against the inner surface of the mold parts. As the unit passes station 5, the valve stem 168 rides down ramp 24 onto plate 17. In such position, as shown in Fig. 13, port 162 is interconnected by passage 170 with port 166 to supply air to the left side of the cylinder 105 thereby causing the piston 108 to be moved to the right to separate the mold parts 110, 110a of the associated unit. At the same time, air from the cylinder is exhausted through conduit 107, port 167, passage 171 and exhaust port 165. As soon as the mold parts separate, air from tube 157 is shut off at valve 159. Just after the mold parts separate, pin 59 of the associated unit rides up ramp 21 to raise the mandril to horizontal position so that when it reaches station 1, another tube 11 may be extruded thereon by the extruder 10 shown in Fig. 8 of the drawing. When the mold parts separate the hollow article drops off the mandril.

It will now be observed that as the rotor turns, as each unit stops at station 1, a tube will be extruded onto the mandril of said unit. As each unit passes toward station 2, the mandril comes down, the mold parts come together to surround the mandril and the tube is blown into bottle shape. As each unit passes from station 5 to station 6, the mold parts separate, the mandril comes up and the bottle is removed. The operation is continuous since all six units go through the cycle of operations, and while one unit passes from station 1 to station 2 another unit is passing from station 5 to station 6 and other units pass from station 2 to station 3 and so forth. With such a machine, a high production rate is possible, and the operation furthermore is fully automatic since it is only necessary to feed plastic to the hopper 71 and to remove the finished bottles from the mandrils.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

I claim:

1. In combination, a hollow mandril means to extrude a plastic tube thereon, means to maintain the mandril in horizontal position, means to rotate the mandril from horizontal to vertical position, a pair of complementary hollow mold parts, means to bring the mold parts together to surround the mandril when the latter is in vertical position, and means to blow air through the mandril to expand the tube on the mandril against the inner surface of said hollow mold parts.

2. The combination of claim 1, in combination with means to separate the mold parts after the tube has been expanded.

3. The combination of claim 2, in combination with means to rotate the mandril from vertical to horizontal position after the mold parts have been separated.

4. A machine of the character described comprising a rotor, a plurality of similar symmetrically disposed units on said rotor, means for intermittently rotating said rotor through predetermined angles to bring the units successively to predetermined positions, each unit comprising a tubular mandril swingable about a horizontal axis from horizontal down to vertical position, means to maintain the mandril in horizontal position in one predetermined angular position of the unit with which it is associated, and while the rotor is at rest, means for extruding a tube of plastic material onto the mandril in said position, means for swinging the mandril down from horizontal to vertical position as the rotor moves from the first angular position of the unit associated with the mandril toward the next angular position of rest, a pair of complementary mold parts for each unit, means for bringing said mold parts together to surround the dropped mandril after said mandril has dropped, and means for blowing air through the mandril after the mold parts have come together whereby to expand the tube on the mandril against the inner surface of said mold parts.

5. The combination of claim 4, in combination with means to separate the mold parts as the unit associated therewith reaches another predetermined angular position.

6. The combination of claim 5, in combination with means to raise the mandril to a horizontal position after the associated mold parts have been moved away from each other.

7. The combination of claim 4, with means to water cool the mold parts continuously.

8. The combination of claim 4, in combination with valve means on one mold part of each unit and means on the other part of said unit to actuate said valve means to initiate the blowing of air to the mandril for said unit as said mold parts come together.

9. A machine of the character described comprising a fixed horizontal plate, a vertical rotary shaft extending upwardly therefrom, a plurality of similar, symmetrical radially extending units mounted on said shaft, for rotation therewith, means for intermittently rotating said shaft through equal angles, each unit comprising a tubular radial outwardly extending horizontal mandril mounted for rotation about a horizontal axis, means to extrude a tube of plastic material onto the mandril, a pair of complementary mold parts, a cam on said plate, means on said unit controlled by said cam to rotate said mandril from said horizontal position projecting radially outwardly down to a vertical downwardly projecting position, and to rotate said mandril up again to horizontal position, a second cam on said plate, and means controlled by said second cam to move said mold parts toward each other to surround the downwardly projecting mandril, and away from each other to permit the mandril to be moved up to horizontal position.

10. The combination of claim 9, said last means comprising a cylinder, a piston within the cylinder, means including a valve controlled by said second cam to supply fluid to one or the other end of the cylinder to move said piston in one direction or the other in said cylinder, and means connected to said piston to move said mold parts toward or away from each other.

11. The combination of claim 10, in combination with means to supply air to the valves for all of said units as said shaft rotates.

12. The combination of claim 10, in combination with means including a valve controlled by movement of the mold parts together and apart, to supply fluid to the mandril.

13. The combination of claim 10, in combination with means including a valve controlled by the movement of the mold parts together and apart, to supply fluid to the mandril and means to supply air to both valves of each unit as said shaft rotates.

14. The combination of claim 2, said mold parts comprising vessels and means to circulate cooling fluid through said mold parts.

15. The combination of claim 5, in combination with air operated means to actuate said operating means, and means for supplying air continuously for the air operated means for all the units and for the air blowing means for all the units.

16. In combination, means for extruding a tube of thermo plastic material and cutting said extruded tube into lengths, closed at one end, a plurality of hollow mandrils, means to successively move said mandrils to positions for receiving said extruded tubes from said extruding means, means for moving the mandrils with the tubes thereon successively away from said extruding means, a pair of hollow mold parts associated with each mandril and movable toward and away from each other, means to successively move said mandrils which have moved beyond said extruding means to positions between the mold parts associated therewith, means to successively move together the mold parts between which the mandrils with the tubes thereon have moved, said mold parts together forming a hollow mold, so that the mandril will project into the hollow mold formed by said parts when said parts come together on opposite sides of said mandril, and means to successively supply air under pressure to the mandrils which project into said hollow molds, to expand the extruded and cut tubes thereon to form hollow articles.

17. The combination of claim 16, in combination with means to move the mold parts away from each other after the tube therein has been expanded.

18. The combination of claim 16, in combination with means to water cool said mold parts.

19. The combination of claim 16, said mandrils being mounted on a rotor, means to rotate said rotor, said hollow parts being mounted on said rotor whereby the operation is continuous.

20. In combination, a horizontally disposed rotor, a plurality of radially extending mandrils mounted on said rotor for movement therewith and for swinging movement between radially extending and depending positions, means for extruding a plastic tube on each of said mandrils when in its radially extending position, a pair of spaced hollow mold parts arranged below of said mandrils and movable with said rotor, automatic means for moving said mold parts toward each other when the adjacent mandril is in its depending position to thereby form a hollow mold and receive therein the adjacent mandril and its associated tube, and fluid pressure means communicating through said mandril and into said mold to expand said tube against said mold.

21. The combination of claim 20, in combination with automatic means to move the mold parts away from each other after the tube therein has been expanded and means to swing the mandril to its radially extended position after the mold parts have been moved away from each other.

22. The combination of claim 21, in combination with cam actuated means for effecting the swinging movement of said mandril, and a second cam actuated means for effecting the movement of said mold parts toward and away from each other, whereby said mandrils and mold parts are moved in a predetermined relation with respect to the movement of said rotor whereby the operation is continuous.

23. In combination, a hollow mandril mounted for swinging movement between horizontal and depending positions, means to extrude a tube on said mandril when the mandril is in its horizontal position, means for effecting the movement of said mandril to its depending position after a tube has been extruded thereon, a pair of hollow mold parts on opposite sides of the mandril when in its depending position and movable toward and away from each other, means for effecting movement of said mold parts toward each other to form a hollow mold and receive therein said mandril and the associated tube, and fluid pressure means communicating through said mandril and into said mold to expand said tube against said mold.

24. The combination of claim 23, in combination with means to move the mold parts away from each other after the tube therein has been expanded, and means to swing the mandril to its horizontal position after the mold parts have been moved away from each other.

25. In combination, a hollow mandril, means to extrude a plastic tube thereon, a pair of complementary hollow mold parts, means to bring the mold parts together to surround the mandril, means to blow air through the mandril to expand the tube on the mandril against the inner surfaces of said hollow mold parts, means to move the mold parts with the mandril thereon and with the tube expanded from one position to another, and means to separate the mold parts in said other position.

26. A machine for making hollow plastic articles comprising a rotor, a plurality of similar symmetrically disposed equiangularly spaced units on said rotor, means for intermittently rotating said rotor through predetermined angles to bring each unit successively to predetermined angular positions, each unit comprising a tubular mandril, means to extrude a tube of plastic material on the mandril of a unit in one angular position of said unit and while the rotor is at rest, a pair of corresponding mold parts for each unit, means for bringing said mold parts together to surround the mandril on which the plastic tube has been extruded, and means for blowing air through the mandril after the mold parts have come together, whereby to expand the tube on the mandril against the inner surface of said mold parts, each unit with mold parts surrounding its mandril and with expanded tube, being movable to another angular position as the rotor is intermittently rotated.

27. The combination of claim 26, in combination with means to separate said mold parts as said unit reaches said other succeeding angle position.

28. The combination of claim 27, in combination with means to water cool the mold parts continuously.

29. The combination of claim 26, in combination with valve means on one mold part of each unit and means on the other mold part of said unit to actuate said valve means to initiate the blowing of air to said mandril for said unit as said mold parts come together.

30. A machine for making hollow plastic articles comprising a vertical shaft, a plurality of similar symmetrical equiangularly spaced radially extending units mounted on said shaft for rotation therewith, means for intermittently rotating said shaft through equal angles to bring each unit through successive predetermined angular positions, each unit comprising a tubular mandril, means for extruding a tube of plastic material on the mandril of each unit as said unit reaches a predetermined angular position, each unit comprising a pair of complementary mold parts, means to move the mold parts of each unit toward each other to surround the mandril of said unit with the plastic tube extruded thereon in said angular position of said unit, means to supply fluid to the mandril in said angular position of said unit to expand the extruded tube against said mold parts, said unit with mandril and mold parts and expanded tube being movable to another angular position, and means to move said mold parts away from each other in said other angular position.

31. The combination of claim 30, said means for moving the mold parts, comprising a cylinder, a piston within the cylinder, means including a valve to supply fluid to one end or the other end of the cylinder to move said piston in one direction or the other in said cylinder, and means connected to said piston to move said mold parts toward or away from each other.

32. The combination of claim 31, in combination with means to supply to the valves for all said units as said shaft rotates.

33. The combination of claim 30, in combination with means controlled by the angular positions of the units to control the means to supply fluid to the mandril.

34. A machine for making hollow plastic articles comprising a rotor, a plurality of equiangularly spaced units on said rotor, means for intermittently rotating said rotor through predetermined angles to bring each unit successively to predetermined angular positions, each unit comprising a tubular mandril, means to extrude a tube of plastic material onto the mandril of each unit in one angular position of the unit, a pair of corresponding mold parts for each unit, means for bringing said mold parts together to surround the mandril on which the plastic tube has been extruded, means for blowing air through the mandril after the mold parts have come together whereby to expand the tube on the mandril against the inner surface of said mold parts, means to separate the mold parts of each unit as it reaches another succeeding angular position in advance of the position at which the plastic tube is extruded onto the mandril whereby to permit removal of the hollow plastic article, and means to move the unit with the mold parts separated from the angular position where the mold parts are separated to the angular position where the plastic is extruded onto the mandril.

35. The combination of claim 34, the mandril having one open end, and the means for blowing air through the mandril comprising a conduit communicating with the other end of the mandril, and the means for extruding a tube of plastic material onto the mandril comprising means for extruding the plastic tube over the open end of the mandril with said plastic material being extruded toward the opposite end of the mandril.

36. The combination of claim 35, the means for blowing air through the mandril comprising a single supply of air under pressure, and valve means to direct the air to the mandrils of said units one at a time as each mandril reaches a predetermined angular position.

References Cited in the file of this patent

UNITED STATES PATENTS

| | | |
|---|---|---|
| 1,527,557 | Kadow | Feb. 24, 1925 |
| 1,527,559 | Kadow | Feb. 24, 1925 |
| 1,865,967 | Schoonenberg | July 5, 1932 |
| 1,959,428 | Hoge | May 22, 1934 |
| 2,041,788 | Sprunger | May 26, 1936 |
| 2,230,188 | Ferngren | Jan. 28, 1941 |
| 2,290,129 | Moreland et al. | July 14, 1942 |
| 2,331,687 | Hobson | Oct. 12, 1943 |
| 2,657,431 | Slaughter | Nov. 3, 1953 |